3,055,909
PREPARATION OF N-CYCLOHEXYL-2-BENZO-
THIAZOLE SULFENAMIDE
Robert C. Kinstler, Middlesex, and James M. Rodgers, Belle Mead, N.J., assignors to American Cyanamid Company, New York, N.Y., a corporation of Maine
No Drawing. Filed Jan. 13, 1960, Ser. No. 2,112
3 Claims. (Cl. 260—306.6)

The present invention relates to an improved process for the preparation of N-cyclohexyl-2-benzothiazolesulfenamide. More particularly, it is concerned with the use of a two-phase reaction medium wherein N-chlorocyclohexylamine is formed by reaction of cyclohexylamine with sodium hypochlorite in an aqueous phase which is in contact with a water-immiscible solvent phase; the so-formed N-chlorocyclohexylamine being taken up as formed in the organic solvent phase. Therein, after removal of the aqueous phase, it is reacted with 2-mercaptobenzothiazole (hereinafter designated as MBT) or with 2,2′-dibenzothiazyl disulfide (hereinafter designated as MBTS).

N-cyclohexyl-2-benzothiazolesulfenamide, which may be represented by the formula

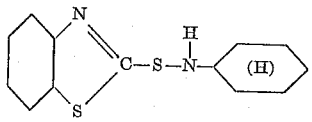

has achieved wide commercial acceptance as a delayed action rubber vulcanization accelerator. In the past, a number of methods for its manufacture have been proposed. Such methods generally result in the formation of the sulfenamide as a finely-divided precipitate in an aqueous medium from which it must be isolated, as by filtration. This product must then be dried. This requires careful temperature control at about 60° C., or below, since the product melts in the temperature range of from about 90° to about 100° C.

Unfortunately, the physical properties of the resulting product are not wholly satisfactory. It is in excessively powdery form. It not only dusts badly in handling but also often tends to cake and form large lumps during storage. In a product such as this, where large quantities are used industrially, it is especially desirable to have the product in a form which may be handled easily. It should be easily incorporated into rubber stock with a minimum of labor and without the cost of dust elimination or recovery operations. A free-flowing, dustless, non-caking product is therefore most desirable.

In the case of some similarly finely-divided products, difficulty with dusting and caking has been overcome by melting the product and cooling it to form flakes. Unfortunately, the product obtained by previously used processes, such as those discussed above, is too unstable to be so-treated.

It is an advantage of the present invention that it provides a simple, more direct method for the preparation of N-cyclohexyl-2-benzothiazolesulfenamide in high yields of high-quality product. Moreover, the final product is obtained directly in a free-flowing, dustless, non-caking, flaked form with a minimum of manipulation and handling. The product quality is sufficiently high that it is accompanied by high stability at and above its melting point. Flaking which could not be satisfactorily practiced in the past is readily accomplished according to the present invention.

In general terms, the procedure of the present invention may be simply described. As in the past, the procedure is carried out in two stages, cyclohexylamine being converted to N-chlorocyclohexylamine in the first. In the second, the resultant chloroamine is reacted with MBT or MBTS to obtain the sulfenamide.

However, in the process of the present invention, these stages are performed in a unique way. Initially cyclohexylamine is taken up in a water-immiscible organic solvent. This is converted to the dual-phase liquid reaction medium of the process of this invention by addition thereto, first, of a volume of water usually about equal to the original solvent volume; then, of an aqueous solution of a suitable alkali metal hypochlorite, such as sodium or potassium hypochlorite. The resultant mixture is thoroughly dispersed by effective agitation.

Cyclohexylamine reacts with the hypochlorite in the aqueous phase. However, as the resultant N-chlorocyclohexylamine is formed, it is promptly dissolved in the organic phase. Thereafter, the organic phase is separated out and the chloroamine is reacted therein with the MBT or MBTS. Resultant sulfenamide is then collected in stable molten form by evaporation of the solvent. Finally, the resultant melt is spread on a cooled surface and in the resultant solidified form is removed therefrom to obtain the product as free-flowing non-dusting flakes.

In large-scale commercial operation, the present process, which results in direct formation of highly stable sulfenamide in an organic solvent which may be easily removed leaving molten sulfenamide, offers many real advantages over processes where the product not only must be isolated from an aqueous slurry by filtration followed by excessively careful drying, but even then is obtained in a much less desirable form.

When produced according to the process of the present invention, solvent evaporation is readily accomplished at temperatures and pressures which permit rapid and efficient solvent removal in compact, continuous equipment. Moreover, only liquid materials need be handled instead of semi-solids as in the past. Processing time can be measured in minutes instead of the hours required in previously used processes wherein finely-divided material required slow, careful drying at about 50° to 60° C.

However, as described above in these general terms, the simplicity of the present process is perhaps more apparent than real. A number of criteria must be satisfied for optimum results. Among others, these include choice of a correct solvent; use of proper concentrations; maintaining the dual-phase reaction medium efficiently dispersed; using the correct chlorinating agent and maintaining correct reaction temperatures.

Choice of suitable solvent to be employed is limited principally by the requirements of water-insolubility and inertness to the reactants under the rather mild reaction conditions. Suitable solvents include, for example, such chlorinated aliphatic hydrocarbons as carbon tetrachloride and trichloroethylene, such aromatic hydrocarbons as benzene, toluene, the xylenes and their halogenated derivatives, thiophene nitrobenzene and the like. Use of halogenated aromatic hydrocarbons of the benzene series, such as the mono- and dichlorobenzenes, constitutes a preferred embodiment of this invention.

One unique feature of this invention is in the proportions used in establishing the dual-phase dispersion in which the chlorination is carried out. In United States Letters Patent 2,496,085, N-chlorocyclohexylamine also is prepared, although for subsequent reaction with an alkali metal salt of a mercaptobenzothiazole. Therein, it is indicated that during chlorination high concentrations are necessary in order to force the reaction to completion.

Surprisingly, however, according to the present invention, the use of greater dilution in low concentrations is found to produce much better results. In starting an operation according to the present process, a minimum volume ratio of aqueous phase to solvent phase of about 1:5 should be present before adding the aqueous hypochlorite solution thereto. This is necessary to insure obtaining an end product of sufficiently high purity for successful flaking. A larger ratio than 1:5 is usually better. Ratios of from about 1:2 to about 1:3 represent good general practice and usually constitute the preferred range. A ratio of about 1:1 is about the practical maximum in actual use. Although more water than about the 1:1 ratio may be added at this stage, this will seldom be done. Greater amounts produce no further substantial increases in product purity. Moreover, such amounts unnecessarily take up room in the reaction vessel and although the solubility losses are low, they are increased unnecessarily by using ratios above about 1:1.

As to the amount of amine, i.e., the concentration to be used, the requirements may be met over a fairly wide range. However, for optimum results, the preferred initial cyclohexylamine molar concentration to be taken up in the solvent before active dispersion is from about one to to about three or approximately 100 to 300 g./liter.

In the past, one of the problems involved was the products produced by side-chlorination reactions. It is a further advantage of the present invention that in the dispersed dual-phase medium, at the dilutions and proportions used, these side effects are markedly reduced. Moreover, carrying out the chlorination in an aqueous medium in contact with an organic solvent, as done herein, the N-chloro derivative is taken up by the organic solvent as it forms. Maintaining the two-phase system in vigorous agitation by efficient mixing or stirring equipment is therefore desirable to optimum good yields and high quality.

The lowest practicable temperature during the chlorinating reaction should be maintained. In general, it may range from about minus ten to about ten degrees centigrade. Usually an average temperature of about zero degrees will be found good practice if the apparatus used has sufficient cooling capacity to maintain this average.

In order to obtain optimum results, it is necessary also to carry out the chlorination of the cyclohexylamine by treatment of a mixture of the solvent solution of the amine and water with aqueous hypochlorite solution. For example, if, as in prior proposals, direct chlorination in an organic solvent is used, a much lower yield of the final desired product is obtained. Moreover, the product is so low in purity that the material is completely unsuitable for flaking.

Once chlorination has been completed, agitation is stopped and the two layers are allowed to settle out and then are separated, as by decantation. The resultant organic solvent solution of the chloroamine is used as the medium in which to carry out the reaction with the MBT or MBTS.

As in the chlorination step, a controlled, low operating temperature is also essential. Although the average temperature may be somewhat higher than during chlorination, in general the reaction should be carried out at below about 25° C. The preferable range is from about zero to about ten degrees centigrade.

In using MBT, and MBT:chloroamine mol ratio close to unity should be used. When MBTS is used, an extra mol of cyclohexylamine must be present, two mols of sulfenamide being formed from one mole of MBTS, one mol of the N-chlorocyclohexylamine and one mol of cyclohexylamine.

In either case, since a mole of HCl also is formed, an HCl acceptor is necessary. It should form an insoluble salt. If so desired, a further additional mol of cyclohexylamine may be used conveniently for this purpose. However, anhydrous ammonia may be substituted as acceptor, at least in part. In any case, the acceptor is provided in the mixture in about molecular proportion to the amount of hydrogen chloride formed.

After condensation with the thiazole compound is complete, the resultant precipitated ammonium chloride or other salt is removed, as by filtration. Thereafter, the solvent is removed as by evaporation, yielding the desired sulfenamide product in the form of molten material. Any excess cyclohexylamine which may be present in the reaction mixture after removal of the by-product hydrochloride is simply evaporated along with the solvent and thereby recycled.

During evaporation of the solvent temperatures above about 120° C., generally should be avoided. Depending on the solvent used, this can be accomplished by suitable reduction of the pressure. However, the present invention enables the isolation period to be reduced to a fraction of that previously required. The resulting increased apparatus capacity also is a marked advantage of this invention.

The invention will be further described in conjunction with the following illustrative examples. Therein, unless otherwise specified, all parts and percentages are by weight and temperatures are in degrees centigrade.

*Example 1*

To 1,000 ml. of monochlorobenzene is added 500 ml. of water and 222 g. (2.24 mols) of cyclohexylamine. The mixture is stirred, cooled to 0° C., and 475 ml. of a commercial solution of sodium hypochlorite of 16.0 g./100 ml. (1.0 mol) is added slowly while continuing to cool to hold the temperature below 0° C. The organic layer is separated from the brine layer by settling and decanting and to this organic solution of N-monochlorocyclohexylamine is added 332 g. of 2,2'-dibenzothiazyl disulfide (1.0 mol), while stirring and cooling to below 25° C., the reaction mixture is saturated with anhydrous ammonia gas. When the reaction is complete, as evidenced by no spotting of starch-potassium iodide paste with a drop of the mixture, the mixture is heated to 32° C. The by-product ammonium chloride is filtered from the solution of product in monochlorobenzene and the latter is evaporated at from about 101° to 103° C. under reduced pressure over a period of three hours. A yield of 524 g., or 99.3% of theory based on the 2,2'-benzothiazyl disulfide is obtained. The product analyzes as 96.6% N-cyclohexyl-2-benzothiazolesulfenamide containing only 0.1% of methanol insoluble material. The molten product crystallized easily when spread on a cold surface. It is flaked in a conventional drum flaker, giving material in the form of flakes which are free-flowing, non-caking and dustless.

*Example 2*

To illustrate the adverse effect produced when chlorination is carried out without using excess water in the chlorination mixture, Example 1 is repeated except that no water is added to the monochlorobenzene and cyclohexylamine before addition of the sodium hypochlorite solution.

To a mixture of 223 g. of cyclohexylamine and 1,000 ml. of monochlorobenzene is slowly added 460 ml. of sodium hypochlorite solution (of 16.2 g./100 ml. concentration) while stirring and cooling to hold the temperature at from minus 3° to 0° C. The organic layer is separated from the brine solution and analyzed for N-monochlorocyclohexylamine, showing the presence of 0.958 mol. The organic layer is stirred and 318 g. (0.958 mol) of 2,2'-dibenzothiazyl disulfide added while cooling and adding sufficient anhydrous ammonia gas to saturate the mixture. When reaction is complete, the mixture is heated to 32° C. and by-product ammonium chloride filtered from the solution of product in monochlorobenzene. Product yield after vacuum evaporation of the solvent at 100°–101° C. for two hours at 10 mm. Hg absolute pressure is 505 g., or about 99.8% of the theoretical based on the 2,2'-benzothiazyl disulfide. However, the product analyzes only 85.4% N-cyclohexyl-2-benzothiazolesulfenamide and contained 2.4% methanol insoluble material. The molten product exhibited super cooling and did not crystallize readily on a cold surface.

Example 3

To 210 parts of monochlorobenzene is added 50 parts of water and 45 parts (0.454 mol) of cyclohexylamine. The mixture is stirred, cooled to 0° C. and 149 parts by volume of sodium hypochlorite solution (0.30 mol) of 15.0 g./100 ml. concentration is added over one hour at about minus 5° to 2° C. The organic layer is separated from the water layer. A total of 50.2 parts (0.30 mol) of 2-mercaptobenzothiazole is added over a period of 35 minutes while the reaction mixture is stirred at 0° to 10° C. and saturated with anhydrous ammonia gas. The reaction mixture is heated to 30° C. and filtered to remove by-product ammonium chloride crystals. From the solution of product dissolved in monochlorobenzene, the solvent is evaporated from the product in 1.5 hours under reduced pressure ending at 10 mm. of mercury absolute pressure and 110° C. Upon condensation, recovered solvent is analyzed and found to contain 0.15 mol of cyclohexylamine. The molten product solidified quickly. The yield was 77.0 g. or 97% of theoretical, based on both the 2-mercaptobenzothiazole and the cyclohexylamine. The product analyzed as 96% pure and contained less than 1% of methanol insoluble material. The molten material when flaked on a conventional drum flaker give a product which was non-dusting, non-caking and free-flowing.

To demonstrate the inferior result obtained by chlorination of cyclohexylamine in only a small amount of water, using no excess water nor organic solvent phase, the following example is given. In addition, condensation with MBT is carried out in aqueous medium as in various prior art references.

Example 4

To 91 ml. (0.70 mol) of cyclohexylamine is added with active stirring at about 5° C., 358 ml. (0.64 mol) of sodium hypochlorite solution over 45 minutes. To the resulting slurry of white solid in the reaction mixture is added slowly 300 ml. of a solution containing 100.2 g. of 2-mercaptobenzothiazole and 25 g. of sodium hydroxide in water. Addition of sodium mercaptobenzothiazole is accomplished, while stirring and cooling at about 5° to 7° C., in 50 minutes. Reaction is complete, as evidenced by a negative test for the N-chloroamine on starch-potassium iodide paste. Resulting precipitate is filtered and washed thoroughly. After drying for 16 hours at 50° to 60° C., 161.8 g. (80.8% of theoretical) of product is recovered. It contains 91.5% N-cyclohexyl-2-benzothiazolesulfenamide and 0.1% benzothiazyl disulfide. A 50 gram portion of this product is dissolved in 200 grams of monochlorobenzene and subjected to temperatures of 100 to 110° C. for 1½ hours while the solvent is evaporated under vacuum. Resulting molten material will not solidify except after several hours. Resultant solids analyze only 71.4% pure and contain 4.9% of disulfide.

We claim:
1. In a method for the preparation of N-cyclohexyl-2-benzothiazolesulfenamide in which cyclohexylamine is converted to N-chlorocyclohexylamine by reaction of cyclohexylamine with an aqueous solution of an alkali metal hypochlorite, and the so-formed N-chlorocyclohexylamine is reacted in an organic solvent with a benzothiazole derivative selected from the group consisting of 2-mercaptobenzothiazole and 2,2'-dibenzothiazyl disulfide in the presence of a hydrogen chloride acceptor, the by-product hydrochloride is removed and the solvent is distilled from the residue to obtain the product sulfenamide, the improvement which comprises:
dissolving the cyclohexylamine in an inert, water-immiscible organic solvent, adding thereto sufficient water to form a dual-phase system of water in contact with the organic solvent wherein the water: organic solvent ratio is from about 1:5 to about 1:1.2; adding thereto an aqueous solution of said alkali metal hypochlorite; during said addition, agitating the resulting mixture sufficiently well to form a dual-phase medium in which said organic solvent solution is dispersed in the aqueous solution; maintaining the resulting dispersion under agitation and at an average temperature in the range of from about minus 10° to about 10° C., until the resulting chlorination of the cyclohexylamine substantially ceases; then stopping the agitation, whereby the mixture separates into an aqueous layer and an organic layer, N-chlorocyclohexylamine being dissolved in said organic layer; collecting said organic layer and without isolation of the N-chlorocyclohexylamine reacting therewith, in said solution, said benzothiazole derivative.

2. A process according to claim 1 in which the reaction with said benzothiazole derivative is carried out at a temperature in the range from about 0° C. to about 10° C.

3. A process according to claim 2 in which, after reaction with the benzothiazole derivative is completed, the resultant mixture is clarified and the clarified solution is subjected to a temperature below 120° C., until a substantially solvent-free melt is obtained, said melt being readily flakable by solidification in contact with a cooled surface.

References Cited in the file of this patent

UNITED STATES PATENTS

| | | |
|---|---|---|
| 2,495,085 | Alliger | Jan. 17, 1950 |
| 2,581,921 | Alliger | Jan. 8, 1952 |
| 2,730,527 | Kinstler | Jan. 10, 1956 |
| 2,762,814 | Lunt | Sept. 11, 1956 |

FOREIGN PATENTS

| | | |
|---|---|---|
| 519,617 | Great Britain | Apr. 2, 1940 |